Patented May 10, 1949

2,469,353

UNITED STATES PATENT OFFICE 2,469,353

CEMENTING EARTH BORES

Irwin W. Alcorn, Houston, Tex., and Donald C. Bond, Northbrook, Ill., assignors to The Pure Oil Company, Chicago, Ill., a corporation of Ohio No Drawing. Application October 11, 1944, Serial No. 558,272

3 Claims. (Cl. 166—22)

This invention relates to a method of cementing fluid producing earth bores and to compositions used therein.

In cementing operations involving injection of cement slurry in an earth bore, between the bore and the casing, difficulty is frequently experienced because of the fact that the water in the cement slurry filters into the porous formation, leaving a thick filter cake on the wall of the earth bore. The resulting filter cake forms a solid mass which obstructs further flow of cement slurry through the annular space between the casing and the earth bore. In some cases it is possible to pump only a portion of the required slurry into the earth bore because of the obstruction caused by the filter cake resulting in a poor cement job.

An object of this invention is to provide an improved method for cementing earth bores.

Another object of this invention is to provide an improved composition for use in cementing earth bores.

Further objects of the invention will become manifest from the following description.

We have discovered that if a small amount of soy bean protein and alkali is added to conventional cement slurries used in cementing oil wells and other earth bores, filtration of the aqueous phase of the slurry into the earth bore formation is greatly retarded, thereby preventing the slurry from setting up rapidly into a solid mass and enabling the slurry in required amounts to be pumped to the desired location in the earth bore. By proper regulation of the amount of soy bean protein and alkali, the inhibiting effect above mentioned can be obtained without appreciably detracting from the setting properties of the cement.

We have discovered that if soy bean protein is added to conventional type cement slurry used in cementing operations in earth bores in the amount of approximately 0.1 to 4% by weight of the cement slurry and if caustic soda is added to the slurry in amounts of at least 10% by weight of the soy bean protein, the filtration of the aqueous phase of the slurry into the well formation is sufficiently inhibited to prevent rapid loss of water and setting up of the cement, and the cement will set within a reasonable time after being pumped into place. Instead of caustic soda any equivalent alkali may be used. The amount of caustic soda or other alkali which is added to the slurry is dependent on the amount of soy bean protein. Where the amount of soy bean protein is approximately 0.5% or less by weight of the cement slurrry the amount of caustic soda required is not more than approximately 10% by weight of the soy bean protein. As the amount of soy bean protein in the slurry is increased the ratio of caustic soda to the soy bean protein should be increased. Thus while the amount of caustic soda used when the amount of sealing agent is approximately 0.5% by weight need not exceed approximately 10% by weight of the protein, when the amount of protein present in the slurry is approximately 1.5 to 2% by weight the amount of caustic soda present should be approximately 20% by weight of the protein. Where alkali other than caustic soda is used the amount of other alkali will be the equivalent of the amount of caustic soda hereinabove specified.

In order to demonstrate the effect of soy bean protein and caustic soda on filtration characteristics, and setting time of cement slurrry, a number of examples of cement slurries were prepared to which were added soy bean protein and/or caustic soda in different amounts. In making the cement slurry the soy bean protein, if added to the slurry, was dispersed in water and heated to approximately 150–200° F., and sodium hydroxide, if used, was added. Dry cement (Universal Atlas Cement Co. 13 UP—22) was then added to the aqueous dispersion at room temperature and the mixture stirred for 15 minutes. The mixture was then filtered on a Buchner funnel 4″ in diameter under a pressure of 700 mm. If the mixture appeared to have good filtration characteristics as demonstrated by the Buchner funnel test, it was then tested in a baroid mud filter testing apparatus under 100 pounds per square inch pressure. This apparatus is described in "Drilling Mud," a publication of the Baroid Sales Department, National Pigment and Chemical Company, and published May, 1938. A sample of each mixture was set aside in a covered tin can for observation of the approximate setting time.

The compositions of the various samples tested with the filtration results in the baroid mud filter testing apparatus, and the setting times observed are set forth in the following Table I.

Table I

| Mixture No. | Grams of Soy Bean Protein | Grams of H₂O | Grams of 10% NaOH | Grams of Cement | cc. Filtrate in 30 Minutes | Setting Time |
|---|---|---|---|---|---|---|
| 1 | 40 | 310 | 0 | 300 | 1.8 | No setting in 2 days. |
| 2 | 20 | 130 | 0 | 150 | 1.4 | Do. |
| 3 | 10 | 110 | 0 | 150 | 3.0 | Do. |
| 4 | 10 | 80 | 10 | 150 | 2.6 | Fairly hard in 3 days. |
| 5 | 10 | 80 | 10 | 200 | 2.4 | Do. |
| 6 | 5 | 85 | 10 | 200 | 3.8 | Solid, not hard in 24 hours. Almost as hard as No. 10 in 48 hours. |
| 7 | 5 | 96 | 5 | 200 | 4.2 | Still soft after 2 days. |
| 8 | 3 | 94 | 3 | 200 | 5.4 | Solid, rather weak after 2 days. |
| 9 | 1.5 | 97 | 1.5 | 200 | 9.1 | Almost as hard as No. 10 in 48 hours. |
| 10 | 0 | 100 | 0 | 200 | 27 cc. in 15 seconds (dry) (Buchner Funnel). | Set hard in 24 hours. |
| 11 | 0 | 95 | 5 | 200 | 27 cc. in 30 seconds at 10 lbs. (dry) | |

Referring to the table, it will be seen that the compositions (mixtures Nos. 1 to 3) which contained no sodium hydroxide did not set in two days. Upon addition of sodium hydroxide to the cement slurry, setting time improved as shown by the results obtained on mixtures 4 to 6. In mixtures 4 and 5 in which the sealing agent was present in the amount of 3.33%, the composition required 3 days to set to a fairly hard condition, whereas in mixture No. 6 in which the sealing agent was present in the amount of 1.66% by weight, the mixture set hard in 48 hours.

The results for mixtures 7 and 8 demonstrate that insufficient caustic soda was present to cause the composition to set within the desired period of time. Mixture No. 9 demonstrates that with an amount of sealing agent of approximately 0.5% by weight, the composition will set hard in 48 hours with only 10% of sodium hydroxide present based on the protein.

Comparing mixtures 1 to 9 with mixtures 10 and 11 in which no soy bean protein was present, it will be seen that the filtration characteristics of the composition containing the soy bean protein are greatly superior to those not containing soy bean protein. However, the setting characteristics of the cement slurry not containing soy bean protein are somewhat better than the setting characteristics of the slurries containing the protein.

Similar tests were made on special Portland cement treated to prevent flash setting caused by high temperatures encountered in deep wells. The cement used in the tests is a product known as "Victor High-temperature Oil Well Cement P. O. 871461-D," made by Southwestern Portland Cement Company. The results of these tests are tabulated in the following Table II:

Table II

| Mixture No. | Grams of Soy Bean Protein | Grams of H₂O | Grams of 10% NaOH | Grams of Cement | 100 lb. Filter Test Baroid Mud Tester | | Setting Time in Hrs. |
|---|---|---|---|---|---|---|---|
| | | | | | Time in Minutes | cc. Filtrate | |
| 12 | 5 | 85 | 10 | 250 | 5 | 4.5 | <24 |
| 12 | | | | | 10 | 4.5 | |
| 12 | | | | | 15 | 6.0 | |
| 12 | | | | | 30 | 7.8 | |
| 13 | 3 | 91 | 6 | 250 | 5 | 5.0 | <24 |
| 13 | | | | | 10 | 5.8 | |
| 13 | | | | | 15 | 6.5 | |
| 13 | | | | | 30 | 8.5 | |
| 14 | 1.5 | 97 | 1.5 | 250 | 5 | 5.0 | <24 |
| 14 | | | | | 10 | 6.5 | |
| 14 | | | | | 15 | 7.5 | |
| 14 | | | | | 30 | 9.4 | |
| 15 | None | 100 | None | 250 | 0.5 | 45 (dry) | <24 |

The results in Table II demonstrate that small amounts of soy bean protein effectively seal high-temperature cement slurries without materially affecting the setting time thereof. Whereas the slurry containing no soy bean protein filtered dry in one half minute, a slurry containing only .43% by weight of soy bean protein (mixture No. 14) produced only 9.4 cc. of filtrate in 30 minutes.

Wherever "cement" is used in the specification and claims it refers to Portland cement as defined by the American Society for Testing Materials designation C-9 of 1930.

It will be seen, therefore, that we have succeeded in providing a method and composition for cementing earth bores which avoids rapid filtration of the aqueous phase of the cement slurry into the well formation thereby assuring satisfactory cementing operations.

It is claimed:

1. The method of cementing oil and gas producing earth bores comprising, pumping into the earth bore a hydraulic cement slurry containing approximately 0.1 to 4.0 per cent by weight of soy bean protein and an alkali metal hydroxide in the amount of about 10 to 20 per cent of the weight of the soy bean protein and 0.01 to 0.8 per cent by weight of the total composition and allowing the slurry to set.

2. The method in accordance with claim 1 in which the cement slurry contains about 1.66 per cent by weight of soy bean protein and 0.33 per cent by weight of sodium hydroxide.

3. The method in accordance with claim 1 in which the cement slurry contains about 0.5 per cent by weight of soy bean protein and about 0.05 per cent by weight of sodium hydroxide.

IRWIN W. ALCORN.
DONALD C. BOND.

REFERENCES CITED

The following references are of record in the file of this patent:

UNITED STATES PATENTS

| Number | Name | Date |
|---|---|---|
| 1,635,500 | Potts | July 12, 1927 |
| 2,079,518 | McQuiston | May 4, 1937 |
| 2,188,767 | Cannon et al. | Jan. 30, 1940 |
| 2,215,812 | Kaplan | Sept. 24, 1940 |
| 2,224,120 | Hart | Dec. 3, 1940 |
| 2,234,642 | Blott et al. | Mar. 11, 1941 |
| 2,290,956 | Greunwald | July 28, 1942 |

FOREIGN PATENTS

| Number | Country | Date |
|---|---|---|
| 15,808 | Great Britain | June 20, 1907 |